July 18, 1950

S. W. E. ANDERSSON 2,515,388

AIR CONDITIONING

Filed Jan. 8, 1948

INVENTOR.
Sven W. E. Andersson
BY
Oliver S. Titcomb
his ATTORNEY

July 18, 1950     S. W. E. ANDERSSON     2,515,388
AIR CONDITIONING

Filed Jan. 8, 1948     4 Sheets-Sheet 3

INVENTOR.
Sven W. E. Andersson
BY
Oliver S. Titcomb
his ATTORNEY

Patented July 18, 1950

2,515,388

UNITED STATES PATENT OFFICE 2,515,388

AIR CONDITIONING

Sven W. E. Andersson, Evansville, Ind., assignor to Servel, Inc., New York, N. Y., a corporation of Delaware Application January 8, 1948, Serial No. 1,251

23 Claims. (Cl. 257—3)

1

The present invention relates to air conditioning and more particularly to controls for regulating the cooling and dehumidification of air in an enclosure. Specifically the present invention relates to improvements in air conditioning controls of the type illustrated and described in my prior copending application entitled Air Conditioning, now United States Letters Patent No. 2,486,908 issued November 1, 1949.

In my prior application a control arrangement is provided for selecting a refrigeration system or heating system for operation and the operation of the selected system is controlled by a thermostat. When the thermostat is satisfied and the humidity is high, a humidostat will initiate operation of the refrigeration and heating systems simultaneously to dehumidify the air by cooling and reheat the dehumidified air. In the illustrated embodiment the control arrangement includes a heat directing diverter valve operated by selective and reheat motors, respectively. Due to the difficulty in obtaining the required nicety of adjustment the air, under certain conditions, may be progressively cooled below comfort conditions or may be heated more than it is cooled causing frequent cycling between cooling and dehumidification.

One of the objects of the present invention is to provide an improved control for an air conditioner which provides a nicety of adjustment to simultaneously dehumidify the air by cooling and reheat the dehumidified air without materially changing the temperature of air delivered to an enclosure.

Another object is to provide a control of the type indicated which regulates the reheating of the dehumidified air in a plurality of steps.

Another object is to provide a control of the types indicated for initiating operation of an air conditioning unit when the humidity is high and no cooling is required to dehumidify the air by cooling, heat the dehumidified air to produce a resultant heating of the air and regulate the heating of the air as the temperature increases.

Another object is to provide a control of the type indicated for dehumidifying the air by cooling, heating the dehumidified air to produce a resultant heating, decreasing the rate of heating as the temperature increases and stopping the heating when cooling is required.

Another object is to provide a control of the type indicated having a thermostat for initiating operation of the unit to cool the air, a humidostat for initiating operation of the unit to simultaneously dehumidify the air by cooling and heat

2 the dehumidified air and an arrangement to provide a supervisory control of the humidostat by the thermostat to regulate the rate of heating as the temperature of the dehumidified air increases.

Another object is to provide a control of the type indicated in which a single electric motor adjusts a control element to cause heating medium to be supplied to a heating element or cooling medium to a cooling element or regulate the simultaneous supply of heating and cooling medium to dehumidify the air by cooling and heat the dehumidified air.

Another object is to provide a control of the type indicated in which a motor control circuit energizes an electric motor to adjust a heat directing valve to one or the other of two positions for heating or cooling, respectively, and adjust the valve to a plurality of positions between said heating and cooling positions in response to humidity and temperature conditions to dehumidify the air by cooling and regulate the heating of the dehumidified air to maintain comfort conditions in an enclosure.

These and other objects will become more apparent from the following description and drawings in which like reference characters denote like parts throughout the several views. It is expressly understood, however, that the drawings are for the purpose of illustration only and not a definition of the limits of the invention, reference being had for this purpose to the appended claims. In the drawings:

Figure 1:
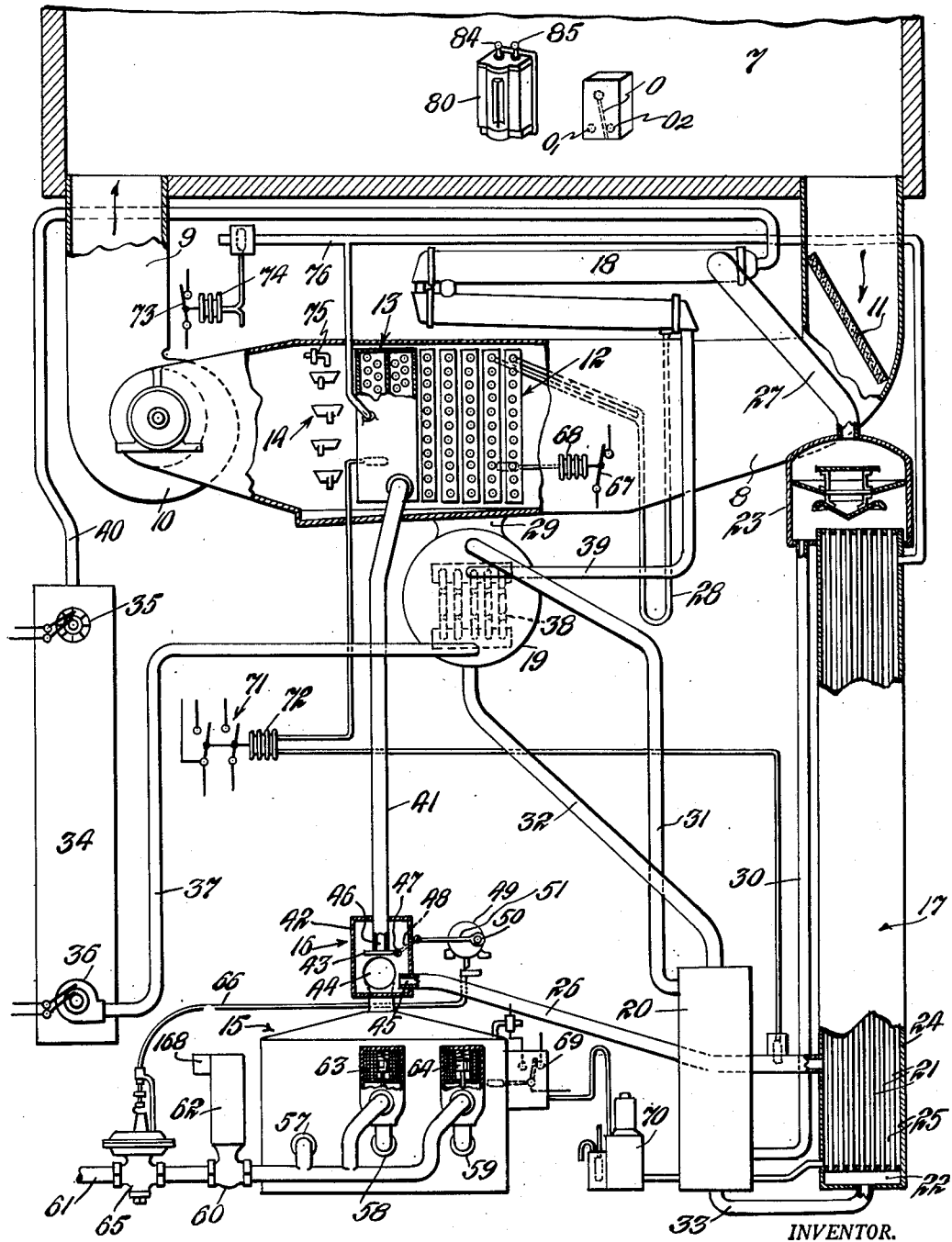
Fig. 1 is a diagrammatic view of a heat operated air conditioning unit for heating the air in an enclosure during the winter and cooling and/or dehumidifying the air in the enclosure during the summer.

The improved control arrangement of the present invention is shown applied to an "All-Year" air conditioner as illustrated and described in my prior Patent No. 2,486,908, referred to above. Fig. 1 illustrates an enclosure 7 to be conditioned and the air conditioning unit comprising a conduit 8 for receiving air from the enclosure and a conduit 9 for delivering air to the enclosure. The air to be conditioned is circulated through the conduits 8 and 9 in the direction indicated by the arrows by means of an electric motor operated blower 10. As the air flows through the conduit 8 it is conditioned by elements mounted therein comprising a filter 11, a cooling element 12, a heating element 13, and a humidifier 14. The cooling element 12 constitutes the evaporator of a heat operated absorption refrigeration system while the heating element 13 constitutes the radiator of a steam heating system. Both the refrigeration system and the heating system are operated by steam from a suitable source, such as a boiler 15, and the directing of heating steam to one or the other or both of the systems is controlled by a diverter valve 16.

The heat operated refrigeration system is preferably of the type illustrated and described in the United States Letters Patent No. 2,282,503 of Albert R. Thomas et al., issued May 12, 1942, entitled Refrigeration. Such an absorption refrigeration system operates in a partial vacuum and utilizes water as a refrigerant and a salt solution as an absorbent. Suffice it to state herein that the refrigeration system comprises a generator 17, condenser 18, evaporator 12, absorber 19 and heat exchanger 20 interconnected to provide a closed circuit. The generator 17 has a series of upright tubes 21 connected at their lower end to an inlet chamber 22 for absorption solution and connected at their upper ends to a separating chamber 23. Surrounding the tubes 21 is a shell 24 providing a heating chamber 25 therebetween.

Steam is supplied to the heating chamber 25 from the boiler 15 through the diverter valve 16 and conduit 26 and heat is transferred from the steam through the tubes 21 to the absorption solution therein to expel refrigerant vapor therefrom. The refrigerant vapor rises upwardly through the tubes 21 at considerable velocity and raises the absorption solution at the sides of the tubes by a climbing film action. The refrigerant vapor flows from the separating chamber 23 to the condenser 18 through a conduit 27 and liquefied refrigerant flows from the condenser through any suitable flow controlling arrangement such as the U-shaped conduit 28 to the evaporator or cooling element 12. Refrigerant vapor flows from the evaporator 12 to the absorber 19 through passages or headers 29.

Absorption solution weak in refrigerant or, in other words, a concentrated salt solution flows by gravity from the separating chamber 23 to the top of the absorber 19 in a path of flow including the conduit 30, heat exchanger 20 and conduit 31. The solution absorbs the refrigerant vapor in the absorber 19 and this solution strong in refrigerant or, in other words, dilute salt solution flows by gravity from the bottom of the absorber 19 to the inlet chamber 22 at the bottom of the generator 17 in a path of flow including the conduit 32, heat exchanger 20 and conduit 33. The absorption of refrigerant vapor in the absorber 19 maintains a relatively low pressure and temperature in the evaporator 12 to produce a refrigerating effect and the low pressure in the evaporator and absorber is maintained by liquid columns in the conduits 28, 31 and 32.

The absorber 19 and condenser 18 are cooled by cooling water from any suitable source such as the cooling tower 34 illustrated in Fig. 1 of the drawings. The cooling tower 34 may be of any suitable construction and, as shown, has an electric motor driven fan 35 adjacent its upper end to produce a flow of air upwardly therethrough and an electric motor driven pump 36 at the bottom of the tower to circulate cooling water through the absorber 19 and condenser 18 of the refrigeration system. The path of flow for the cooling water includes the conduit 37, cooling coils 38 in the absorber, conduit 39, condenser 18 and conduit 40 back to the top of the cooling tower.

The heating system comprises the radiator 13 and a conduit 41 connecting the radiator to the diverter valve 16 and boiler 15.

Steam is supplied to either the refrigeration system or heating system by the diverter valve 16 illustrated diagrammatically in Fig. 1 as comprising a valve body in the form of a steam box or chamber 42 mounted on the boiler 15 and a valve element 43. The valve body 42 has a steam inlet port 44 connected to the boiler 15, an outlet port 45 for connection with the conduit 26 for supplying steam to the generator 17 and a port 46 for connection with the conduit 41 for supplying steam to the radiator 13. The valve element 43 is mounted on a rock shaft 47 journaled in suitable bearings in the valve body 42. As illustrated in Fig. 1 the valve element 43 is in the form of a thin plate or disk which is positioned edgewise to the inlet port 44 so as to proportionately divide the steam therefrom between the outlet ports 45 and 46 in accordance with its relative angular position between said ports. A crank arm 48 is mounted on the end of the shaft 47 outside of the valve body 42 for rocking the shaft 47 to engage the valve element 43 with the valve port 45 or 46.

The valve element 43 is actuated from one to the other of its two extreme positions and to a plurality of adjusted positions therebetween by a reversing electric motor 49 having a crank arm 50 connected to the valve crank arm 48 by a link 51. The motor 49 is preferably a low voltage capacitor type which drives the output shaft through a self-locking gear train, not shown. As illustrated diagrammatically in Fig. 2, the motor 49 has field windings 52 and 53 and a condenser 54 connected between the windings. One of the field windings 52 or 53 is energized directly and the other winding is energized through the condenser 54 which changes the current phase to produce a rotating magnetic field required for starting the motor. Thus, the direction of rotation of the motor 49 will depend upon which winding is energized directly. Limit switches 55 and 56 are connected in series with the respective field windings 52 and 53 and the switches are actuated by suitable cams operated from the motor shaft to stop the motor when the valve element 43 is moved into engagement with port 45 or 46, respectively. Operation of the motor is regulated by a motor control circuit as later explained in detail.

The boiler 15 may be heated by any suitable type of fluid fuel burners such as the plurality of gas burners 57, 58 and 59 illustrated in Fig. 1. The flow of fuel to all of the burners 57, 58 and 59 is controlled by a master valve 60 in the fuel supply line 61 operated by an electric motor 62 and by individual magnetically operated control valves 63 and 64 for the burners 58 and 59. As more heat may be required by the heating system to heat the air than is required by the refrigeration system to cool the air, a gas pressure regulator 65 may be provided in the fuel supply line 61. The gas pressure regulator 65 is adjusted by the motor 49 through a Bowden wire 66.

The air conditioning unit also includes a low temperature cut-out switch 67 having a thermal responsive element 68 subjected to the temperature in the evaporator 12; a low water cut-out unit 69 for maintaining water in the boiler 15; a condensate return pump 70 for delivering condensate from the generator heating chamber 25 to the boiler; a delayed action control switch 71 operated by a thermal responsive element 72 responsive to the temperature in the heating element 13 and heating chamber 25 of the generator 17; a vent switch 73 operated by a thermal responsive element 74 when steam escapes through a vent pipe 76 from either the generator 17 or heating element 13 or when condensate overflows from the sump of the condensate return pump 70; and a magnetically operated water valve 75 for supplying water to the humidifier 14.

Figure 2:
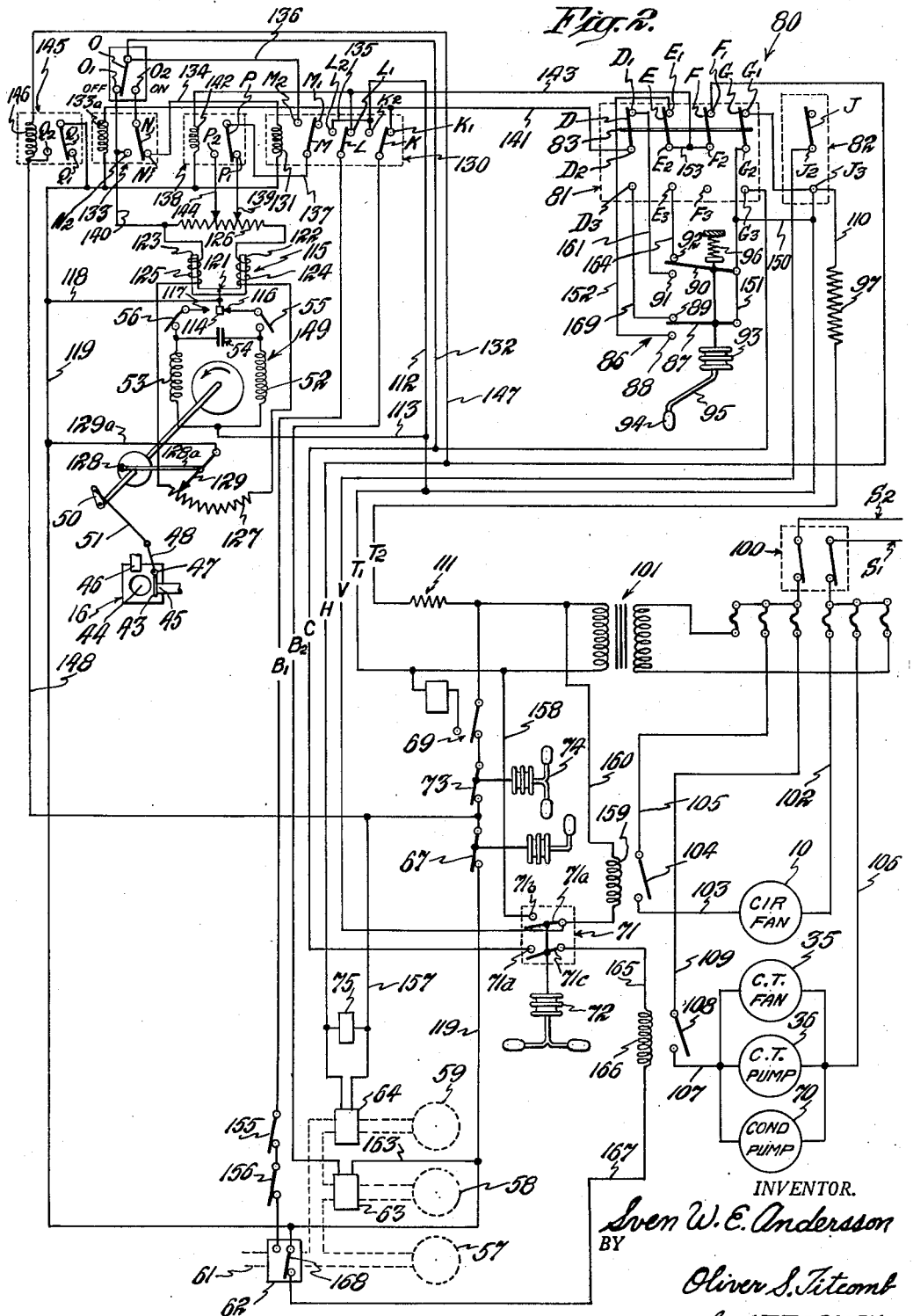
Fig. 2 is a wiring diagram of the electric control circuits for the air conditioning unit illustrated in Fig. 1 and showing the selector switch adjusted for a heating operation and the diverter valve moved to one extreme position to direct heat to the heating element.

The control system for the air conditioning unit including the various operating elements previously described is illustrated diagrammatically in Fig. 2 and comprises a selective controller 80 in the enclosure 7 and a plurality of electric circuits. The controller 80 is in the form of a switch box having a four-pole double-throw selective switch 81 and a single-pole double-throw ventilating switch 82. The four poles of the switch 81 are indicated by the reference characters D, E, F and G, and the three contacts for each pole are indicated by the reference character for the pole and the subscript 1, 2 and 3, such as, $D_1$, $D_2$ and $D_3$, etc. The four poles are mechanically connected by a bar 83, see Fig. 2, for simultaneous operation by a manually operable lever 84, see Fig. 1. When the four-pole switch 81 is moved to the upper position illustrated in Fig. 2 to engage poles D, E, F and G with fixed contacts $D_1$, $E_1$, $F_1$ and $G_1$, it connects certain of the branch circuits to render the heating system operative; when in the lower position illustrated in Figs. 3 to 6 it connects certain of the branch circuits to render the refrigeration system operative; and when moved to an intermediate position it disconnects all of the branch circuits to render both the heating and cooling system inoperative.

Switch 82 has a pole J and fixed contacts $J_2$ and $J_3$, and the pole J is adapted to be operated manually to two positions by a lever 85, see Fig. 1. When the pole J of the switch 82 is in the upper or off position illustrated in Fig. 2 the blower 10 is adapted for joint operation with the selected heating or refrigeration system and when moved to its lower position into engagement with the fixed contact $J_3$ it connects the blower for continuous operation independently of the switch 81.

Also mounted in the switch box of the controller 80 is a temperature responsive switch means 86 illustrated diagrammatically in Fig. 2 as comprising a pair of switches arranged to be actuated in sequential order in two directions of movement. One of the switches has a movable contact 87 and a pair of fixed contacts 88 and 89 at opposite sides thereof and the other switch has a movable contact 90 and a pair of fixed contacts 91 and 92 positioned at its opposite sides. The movable contacts 87 and 90 are adapted to be moved in sequential order by a thermal responsive means comprising an expansible bellows 93, a bulb 94 outside of the switch box subjected to the ambient temperature in the enclosure 5 and a capillary tube 95 connecting the bulb and bellows. The bulb 94 contains a volatile liquid which produces a vapor pressure corresponding to the temperature of the ambient to expand the bellows 93. The switches are so arranged with respect to each other that the bellows 93 first actuates the movable contact 90 into engagement with the fixed contact 92 upon a predetermined rise in temperature and thereafter actuates the movable contact 87 into engagement with the fixed contact 89 upon a further predetermined rise in temperature. A spring 86 actuates the movable contacts 87 and 90 successively into engagement with the fixed contacts 88 and 91 upon a fall in the temperature of the ambient. To make the bulb 94 of the thermostat the coldest and therefore the sensitive part to changes in ambient temperature a heater is provided in the switch box comprising an electric resistance element 97.

The electric control system includes line voltage circuits for energizing the motors for the blower 10, cooling tower fan 35 and pump 36 and condensate pump 70, and low voltage circuits for controlling all other elements of the air conditioning unit. Electric current is supplied to the control system from the service mains $S_1$, $S_2$, through a line switch 100 to the primary winding of a step-down transformer 101. The circuit for the motor of the blower 10 is connected across the service mains $S_1$ and $S_2$ in parallel with the primary winding of the transformer 101 and comprises the conductor 102 connecting the line $S_1$ to one side of the blower motor, a conductor 103 connecting the other side of the blower motor to a relay switch 104 and a conductor 105 connecting relay switch to the other service line $S_2$. The motors for the cooling tower fan 35, cooling tower pump 36, and condensate return pump 70 are connected in parallel for simultaneous operation and the circuit therefor comprises a conductor 106 connecting the service line $S_1$ to one side of the motors, a conductor 107 connecting the other sides of the motors to a relay switch 108 and a conductor 109 connecting the relay switch to the service line $S_2$. As illustrated, all of the line voltage circuits are protected by suitable fuses.

The resistance element 97 for heating the interior of the control box 80 is connected across the secondary terminals of the step-down transformer 101 by an electric circuit comprising a conductor $T_1$ connecting one terminal of the transformer to the fixed contact $J_3$ of the switch 82, a conductor 110 connecting $J_3$ to one side of the resistance element and conductor $T_2$ connecting the other side of the resistance 97 to the other terminal of the transformer secondary. Preferably a second resistance 111 is provided in the conductor $T_2$ to adjust the amount of heat produced by the heating element 97.

Figure 3:
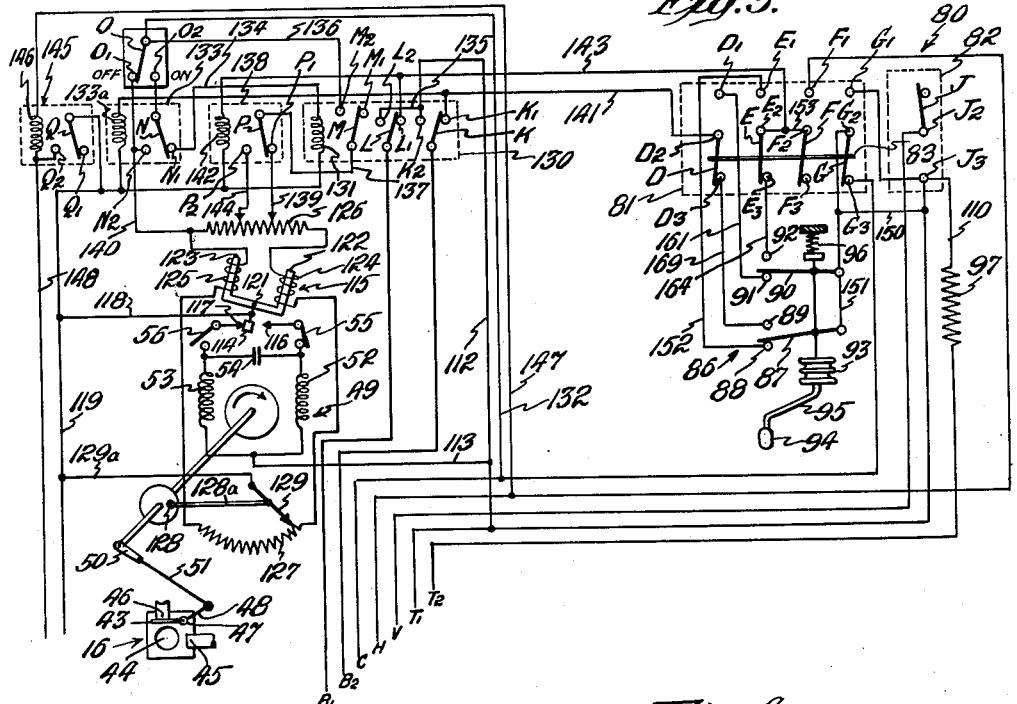
Fig. 3 is a wiring diagram of part of the control circuits illustrated in Fig. 2 and showing the selector switch adjusted for a cooling operation, the diverter positioned to direct heat to the refrigeration system and both the temperature and humidity responsive switches open.

The control system also includes a first branch circuit H in parallel with the circuit for the heating resistance 97 for the heating system when selective switch 81 is in its upper position illustrated in Fig. 2; a second branch circuit C in parallel with the circuit for the resistance element 97 for the refrigeration system when selective switch 81 is in its lower position illustrated in Fig. 3; and a plurality of tertiary circuits B1 and B2 to control the rate of operation of the selected system. A branch circuit V is also provided for starting and stopping the circulating fan by the manually operable switch 82 for ventilating the enclosure independently of a heating and cooling operation. In the following description the reference characters T2, T1, V, H, C, B2 and B1 are also used to indicate the conductors of the branch circuits. As thus far described the air conditioner and control circuits are substantially identical with those illustrated and described in my prior Patent No. 2,486,908, referred to above.

In accordance with the present invention a control arrangement is provided for the motor 49 to energize the field windings 52 and 53 so as to operate the motor to adjust the valve element 43 to the position illustrated in Fig. 2 to select the heating system for operation; energize the field windings so as to adjust the valve element 43 to the position illustrated in Figs. 3 to 6 to select the refrigeration system for operation; and energize the field windings under the control of a humidostat and thermostat to adjust the valve element 43 for operating the refrigeration and heating systems simultaneously to dehumidify the air by cooling, reheat the dehumidified air and regulate the rate of heating as the temperature increases.

The control arangement includes a motor control circuit for the motor 49 as illustrated in Fig. 2. One of the ends of the motor field windings 52 and 53 are connected together and to one terminal of the transformer 101 by conductors T1, 112 and 113. Energization of the field windings 52 and 53 is controlled by the limit switches 55 and 56 and the movable contact 114 of a tilting relay 115. The movable contact 114 of the tilting relay is engageable with fixed contacts 116 and 117 connected to the opposite ends of the field windings 52 and 53, respectively, beyond the limit switches 55 and 56. An electric circuit is completed from the field windings 52 and 53 through limit switch 55 or 56, tilting relay contact 114, conductor 118, and a common return conductor 119 connected to the other terminal of the transformer 101 through the conductor T2. As shown in Fig. 2 the low temperature cut-out switch 67, the vent switch 73 and the low water control switch 69 are connected in series in the common return conductor 119. As previously explained the limit switch 55 is arranged to be opened by the motor 49 when the valve element 43 engages the port 45 and the limit switch 56 is arranged to be opened by the motor 49 when the valve element engages the port 46.

The movable contact 114 of the tilting relay 115 depends from a U-shaped frame pivotally mounted at 121. The arms 122 and 123 of the U-shaped frame are of magnetic material and extend into the magnetic field of a pair of relay coils 124 and 125. The tilting relay 115 is so arranged on the pivot 121 as to engage the movable contact 114 with the fixed contact 116 when the relay coils 124 and 125 are deenergized.

The relay coils 124 and 125 for actuating the tilting relay 115 are connected in the opposite sides of a balancing electric bridge circuit comprising a resistance element 126 connected between one of the ends of the relay coils and a resistance element 127 connected between the other ends of the relay coils. Current is supplied to different taps on the resistance element 126, as later explained, and flows through the relay coils 124 and 125 to opposite ends of the resistance element 127. A crank arm 128 on the motor shaft is connected to a movable or follow-up contact 129 for adjusting the resistance 127 until the current flow through the relay coils 124 and 125 is balanced. The follow-up contact 129 is connected to the common return conductor 119 by a conductor 129a to complete the bridge circuit.

The motor control circuit is connected for control by the selective switch 81 and thermostatic switch means 86 to adjust the valve element 43 for a heating operation or a cooling operation. The motor control circuit also is connected for control by a humidostat to adjust the valve element 43 for dehumidification without cooling and for control by a supervisory thermostat including the temperature responsive switch means 86 to regulate the rate of heating. The humidostat includes a humidity responsive single-pole double-throw switch having a pole O engageable with fixed contact $O_1$ when the humidity is low and with a fixed contact $O_2$ when the humidity is high. Humidity responsive switch O controls a dehumidifying relay 130 for shifting from thermostatic to humidostatic control when the humidity is high and the temperature is below that at which the contact 87 of the temperature responsive switch means 86 engages the contact 89.

The dehumidifying relay 130 comprises a three-pole double-throw switch having poles K, L and M, fixed contacts $K_1$ $K_2$, $L_1$ $L_2$ and $M_1$ $M_2$, respectively, and a relay coil 131. When relay coil 131 is deenergized the poles K and L engage $K_1$ and $L_1$, respectively, as illustrated in Figs. 2 and 3. Contact $K_1$ is connected to contact $D_2$ of the selective switch 81 by conductor 141 and contact $L_1$ is connected to contact $E_2$ by conductor 143 and jumper 153 to connect the branch circuit B1 and B2 through the selective switch and temperature responsive switch means 86 for thermostatic control and pole M engages open circuit contact $M_1$. When the humidity is high and the contact O of the humidity responsive switch moves into engagement with contact $O_2$ the coil 131 of the dehumidifying relay 130 is energized from the C wire through conductor 132, humidity responsive switch O, supervisory relay 133 and conductor 134, the circuit from the relay coil 131 being completed through the common return conductors 119 and T2. Energization of relay coil 131 moves poles K and L into engagement with contacts $K_2$ and $L_2$. Contacts $K_2$ and $L_2$ are connected together by the jumper 135 which is connected to $T_1$ by the conductor 112 to energize branch circuit B2 and B1. Pole M also engages $M_2$ to complete a circuit from C wire through conductors 132 and 136, pole M, conductor 137 and reheat regulating relay 138 to an adjustable tap 139 on the resistance element 126 of the balancing bridge circuit of the motor control.

The supervisory relay 133 is a single-pole double-throw switch having a pole N and fixed contacts $N_1$ and $N_2$. As explained above, contact $N_1$ is connected to the relay coil 131 of the dehumidifying relay 130 and contact $N_2$ is connected in common with the contact $O_1$ of the humidity responsive switch O to one end or tap on the resistance 126. The supervisory relay 133 has a relay coil 133a connected by the conductor 141 to pole D of selective switch 81 and by conductor 169 to contact 89 of the thermostatic switch means 86. Thus, when the temperature is below a predetermined value relay coil 133a is deenergized and contact N engages contact N₁ to energize the relay coil 131 of the dehumidifying relay 130 and upon an increase in temperature relay coil 133a is energized to engage N with N₂ to deenergize coil 131 of relay 130 and complete a circuit to one end of the resistance 126.

The reheat regulating relay 138 also is in the form of a single-pole double-throw switch having a pole P with fixed contacts P₁ and P₂, respectively, and a relay coil 142. As explained above, pole P completes a circuit through contact P₁ and tap 139 to resistance 126 when the relay coil 142 is deenergized. The relay coil 142 is connected by the conductor 143 to pole E of selective switch 81 and by conductor 164 to the contact 92 of the temperature responsive switch means 86. Upon an increase in temperature causing movable contact 90 to engage 92 of the temperature responsive switch means 86, the reheat regulating relay coil 142 is energized to engage pole P with contact P₂ which is connected to the resistance 126 of the motor control circuit by a second tap 144. Circuits through each of the relay coils 131, 133a and 142 are completed through the common return conductors 119 and T₂.

A low temperature cut-out relay 145 also is provided for by-passing the low temperature cut-out switch 67 during heating. The low temperature cut-out relay 145 comprises a single-pole double-throw switch having a pole Q, fixed contacts Q₁ and Q₂ and a relay coil 146. Relay coil 146 is connected to the branch circuit H by a conductor 147 and to the common return conductor 119 between the low temperature switch 67 and vent switch 73 by an auxiliary return conductor 148. Pole Q is connected to the common return conductor 119, contact Q₁ is open and contact Q₂ is connected to the auxiliary return conductor 148 beyond the relay coil 146. During heating cycles circuits from the fuel valve motors 62 and 63 can be completed either through the common return conductors 119 and T₂ when the low temperature cut-out switch 67 is closed or through the return conductor 119 to pole Q and contact Q₂ of relay 145 and from the relay through the auxiliary return conductor 148 when the low temperature cut-out switch is open. The construction and arrangement of the parts of the improved control circuit arrangement having now been described, the mode of operation together with the individual circuits is explained as follows.

*Heating*

To adjust the air conditioning unit for heating, the lever 84 of controller 80, see Fig. 1, is actuated to move the contacts of the selective switch 81 to the upper or heating position illustrated in Fig. 2. As the entire control circuit arrangement is shown in Fig. 2 as adjusted for a heating operation, the description of the heating cycle may be limited to this figure of the drawings. With the selective switch 81 so adjusted, the C wire and balancing bridge circuit for the motor 49 will be deenergized so that the depending contact 114 of tilting relay 115 will engage the fixed contact 116. A circuit will be completed from T₁ through conductors 112 and 113, directly through field winding 52 and also through field winding 53 and condenser 54, limit switch 55, contacts 116, 114, conductor 118 and common return conductors 119 to T₂. If the low temperature cut-out switch 67 should be open, the energization of motor field windings will be delayed until the branch circuit H is energized by the temperature responsive switch means 86 to complete a circuit through the relay coil 146 of the low temperature cut-out relay 145 and engage Q with Q₂. A circuit through the field windings 52 and 53 then will be completed through the conductors 118 and 119, pole Q and contact Q₂ of the low temperature cut-out relay 145 and the auxiliary common return conductor 148 to 119 beyond the low temperature cut-out switch 67 and then to T₂.

Direct energization of the field winding 52 will cause the shaft of the motor 49 to rotate counterclockwise and operate through the crank arm 50, link 51 and crank arm 48 to shift the valve element 43 to the position illustrated in Fig. 2 to close the port 45 to the refrigeration system and open the port 46 to the heating coil 13. At the beginning of the movement of the motor shaft the limit switch 56 will close and at the end of the movement to engage the valve element 43 with the valve port 45 the limit switch 55 will open to deenergize the motor. Movement of the motor shaft also will be transmitted through the Bowden wire 66, see Fig. 1, to adjust the gas pressure regulator 65 to increase the amount of fuel supplied to the burners during a heating cycle. Thus, the control apparatus is adjusted for a heating operation by merely turning the lever 84 of the controller 80.

Upon a decrease in temperature in the enclosure 7 to be conditioned, contact 87 of the temperature responsive means 86 will be moved into engagement with contact 88 which simultaneously energizes branch circuits B₁ and H. Branch circuit B₁ is energized from the transformer 101 through the conductors T₁, 150 and 151, contacts 87 and 88 of the temperature responsive switch means 86, conductor 152, contact E₁, pole E, jumper 153, conductor 143, contacts L₁ and pole L of the dehumidification relay 130, conductor B₁ including safety pilot switches 155, 156, motor 62 for fuel valve 60 and common return conductors 119 and T₂ to the other terminal of the transformer 101. Upon energization of the branch circuit B₁, the motorized fuel valve 60 is opened to supply fuel to the burner 57 to initiate operation of the apparatus to heat the air in the enclosure 7.

Branch circuit H is energized from the transformer 101 through conductors T₁, 150, 151, contacts 87 and 88 of thermostatic switch means 86, conductor 152, contacts E₁, pole E and contact E₂ of selective switch 81, jumper 153, contact F₂, pole F and contact F₁ to conductor H. Conductor H is connected to one side of the actuating coil of the gas valve 64 and the coil of the humidifier water valve 75 and the circuit is completed by a conductor 157 to return conductors 148, 119 to T₂. Upon energization of the branch circuit H fuel valve 64 is opened to supply fuel to the burner 59 and the humidifier water valve 75 is opened to supply water to the humidifier 14. With fuel supplied to the burners 57 and 59 the boiler 15 will generate steam which flows through the diverter valve 16 and conduit 41 to the heating coil 13, see Fig. 1. As soon as steam enters the heating coil 13, the thermostat 72 will close the switch 71. Upon the engagement of contact 71a with 71b a circuit is completed from T₁ through the conductor 158 and coil 159 of the blower relay 104 and conductor 160 to T₂. Upon energization of the coil 159, relay 104 closes to energize the blower 10 and circulate air from the enclosure 7 through the duct 8, heating coil 13, humidifier 14 and duct 9.

Upon a further decrease in temperature the contact 90 will be moved into engagement with contact 91 of the temperature responsive switch means 86 to energize the branch circuit $B_2$. Branch circuit $B_2$ is energized from the transformer 101 through the conductors $T_1$, 150, 151, contacts 90 and 91 of the temperature responsive switch means 86, conductor 161, contacts $D_1$, D and $D_2$ of the selective switch 81, conductor 141, contacts $K_1$ and K of the dehumidification relay 130 to $B_2$. The branch circuit $B_2$ is completed through the actuating coil of the fuel valve 63 and conductor 163 to the common return conductor 119 and $T_2$. If the low temperature cut-out switch 67 is open the circuit through the actuating coil for the fuel valve 63 is completed through the return conductor 119, low temperature cut-out relay 145, auxiliary return conductor 148 to conductor 119 between the low temperature cut-out switch 67 and vent switch 73 and then to $T_2$. Upon energization of the branch circuit $B_2$ the fuel valve 63 is opened to supply fuel to the burner 58. The additional burner 58 will increase the generation of steam in the boiler 15 whereby to heat the air circulated by the blower 10 at a maximum rate.

The air conditioning unit will continue to operate at maximum capacity and the heating coil 13 is so designed as to condense all of the steam supplied from the boiler 15 by the transfer of its latent heat of vaporization to the circulating air. If for any reason the heat is not transferred at a maximum rate so that steam escapes through the vent pipe 76, the vent switch 73 will be actuated to open the branch circuits H, $B_1$ and $B_2$. As soon as the steam ceases to escape from the heating coil 13 the vent switch 73 will close and again energize the branch circuits $B_1$, $B_2$ and H. Thus, the vent switch constitutes a safety device for insuring economy of operation and indicating improper heat transfer.

The air conditioning unit will continue to operate at maximum capacity to heat the air until the temperature in the enclosure 7 increases. Upon an increase in temperature the movable contact 90 will move away from contact 91 of the thermostatic switch means 86 to open the branch circuit $B_2$ and thereby operate the unit at partial capacity. If such heating of the air is insufficient the temperature in the enclosure 7 will decrease to again close the switch contacts 90 and 91 to energize the branch circuit $B_2$. On the other hand, if the temperature in the enclosure 7 continues to increase contact 87 will move to the position illustrated in Fig. 2 to open branch circuits $B_1$ and H and terminate a cycle of operation of the unit. When the temperature in the heating coil 13 decreases sufficiently contacts $71a$ and $71b$ of the delayed action control switch 71 will open and deenergize the coil 159 to open the blower relay 104 and stop the fan. Thus, the heating system is selected for operation by moving the selective switch 81 to the position illustrated in Fig. 2 and the supply of heat to the heating coil 13 is regulated by the thermostatic switch means 86 to increase or decrease the heating of the air in the enclosure 7 as required.

Cooling

To shift the air conditioning unit from heating to cooling, the lever 84 of the controller 80 is actuated to move the selective switch 81 to the lower or cooling position illustrated in Fig. 3. The changes in the circuits to adapt the unit for cooling are all illustrated in Fig. 3 which requires only a comparison with Fig. 2. Upon engagement of the pole G of the selective switch 81 with contact $G_3$ the branch circuit C is energized from the transformer 101 through conductors $T_1$, 150, 151, switch contacts G, $G_3$, conductors C, 132, contacts O, $O_1$, of the humidity responsive switch, and conductor 140 to one end or tap of the resistance 126 of the balancing motor control bridge circuit. The circuit is completed through the two sides of the balancing bridge circuit to the opposite ends of resistance element 127, follow-up contact 129 and conductor $129a$ to the common return conductors 119 and $T_2$. Upon energization of the balancing bridge circuit a greater current flow will occur through the left-hand side of the bridge circuit and relay coil 125 to rock the tilting relay 115 clockwise and engage the contact 114 with the contact 117.

Engagement of the depending contact 114 of the tilting relay 115 with the contact 117 will complete a circuit through the field winding 53 of the motor 49 from the transformer 101 through conductors $T_1$, 112, 113, directly through field winding 53 and also through field winding 52 and condenser 54, limit switch 56, contacts 117 and 114 and conductor 118 to the common return conductor 119 and $T_2$. Direct energization of the field winding 53 will rotate the shaft of the motor 49 clockwise and operating through the crank 50, link 51 and crank 48 will move the valve element 43 to close the port 46 to the heating coil 13 and open the port 45 to the generator 17 of the refrigeration system. As the movement of the motor shaft is initiated the limit switch 55 will close and adjacent the end of the movement to engage the valve element 43 with the port 46, the limit switch 56 will be opened. Rotation of the motor shaft will also operate through the crank 128 and link $128a$ to move the follow-up contact 129 on the resistance 127 to the position illustrated in Fig. 3. Such movement of the follow-up contact 129 tends to equalize or balance the resistance in the left-hand side of the balancing bridge circuit with that in the right-hand side of the circuit but the arrangement is such that a preponderant amount of current will flow through the relay coil 125 to maintain the contact 114 of the tilting relay in engagement with the contact 117.

Upon an increase in temperature in the enclosure 7 the movable contact 90 of the thermostatic switch means 86 will move into engagement with the contact 92 to energize the branch circuit $B_1$ and initiate operation of a cooling cycle. Branch circuit $B_1$ is energized from $T_1$ through conductors 150 and 151, contacts 90 and 92 of the thermally responsive switch means 86, conductor 164, contacts $E_3$, E and $E_2$ of selective switch 81, jumper 153, conductor 143, contacts $L_1$ and L of the dehumidification relay 130 to $B_1$. Branch circuit $B_1$ is completed as previously described to energize the motor 62 and open the fuel valve 60 to supply fuel to the burner 57.

Steam from the boiler 15 will then flow through the diverter valve 16 and conduit 26 to the heating chamber 25 of the generator 17 and initiate operation of the refrigeration system to supply refrigerant to the cooling coils 12. The presence of steam in the conduit 26 adjacent the generator 17 will actuate the thermostat 72 to engage the contacts $71a$ and $71b$ of the delayed action switch 71 to close the blower relay 104 and initiate operation of the circulating blower 10 as previously explained. Engagement of the contact 71c with contact 71d of the switch 71, see Fig. 2, will also complete a circuit from the branch circuit C through the conductor 165, relay coil 166, conductor 167, switch 168 on the valve motor 62 and return conductors 119 and T₂. Energization of the relay coil 166 closes cooling tower relay 108 to initiate operation of the cooling tower fan 35, cooling tower pump 36 and condensate return pump 70, see Fig. 1. Cooling water is then supplied from the cooling tower 34 through conduit 37 to the cooling coils 38 for the absorber 19 and through conduit 39 to condenser 18 and from the condenser 18 through conduit 40 back to the cooling tower. Operation of the condensate return pump 70 withdraws condensate from the heating chamber 25 of the generator 17 and returns it to the boiler 15. The switch 168, see Fig. 2, is operated to closed position by the motor 62 when the fuel valve 60 is first opened and opens the switch 68 upon closure of the valve 60 whereby to stop operation of the cooling tower 34 immediately upon closure of the fuel valve 60.

Upon a further increase in temperature in the enclosure 7 the movable contact 87 of the thermally responsive switch means 86 will engage the contact 89 and energize branch circuit B₂. Branch circuit B₂ is energized from the transformer 101 through the conductors T₁, 150, 151, contacts 87 and 89 of the thermally responsive switch means 86, conductor 169, contacts D₃, D, D₂ of selective switch 81, conductor 141, switch contacts K₁, K of dehumidification relay 130 to B₂. Energization of branch circuit B₂ will actuate fuel valve 63 as previously explained to supply fuel to burner 58. With both burners 57 and 58 operating the refrigeration system will supply refrigerant to the cooling coil 12 at a maximum rate to cool and dehumidify the air circulated from the enclosure 7 through the ducts 8 and 9 by the blower 10.

The refrigeration system will continue to operate at maximum capacity until the temperature in the enclosure 7 decreases and moves contact 87 of the thermostatically responsive switch means 86 away from the contact 89 to open the branch circuit B₂. Upon deenergization of branch circuit B₂ the fuel valve 63 will close so that only burner 57 will supply heat to the boiler 15 and refrigerant to the cooling coil 12 at a reduced rate. If the temperature in the enclosure should then rise the thermostatic switch contact 87 will move into engagement with contact 89 to again energize branch circuit B₂ to operate the refrigeration system at maximum capacity. On the other hand, if the temperature in the enclosure continues to decrease the movable contact 90 will move away from the contact 92 to deenergize the branch circuit B₁ and terminate a cooling cycle. Thus, the control is adjusted for a cooling operation by moving the poles D, E, F and G of the selective switch 81 into engagement with the contacts D₃, E₃, F₃ and G₃ and the operation of the refrigeration system and rate of cooling is regulated by the thermostatic switch means 86.

*Dehumidification under control of humidostat*

Figure 4:
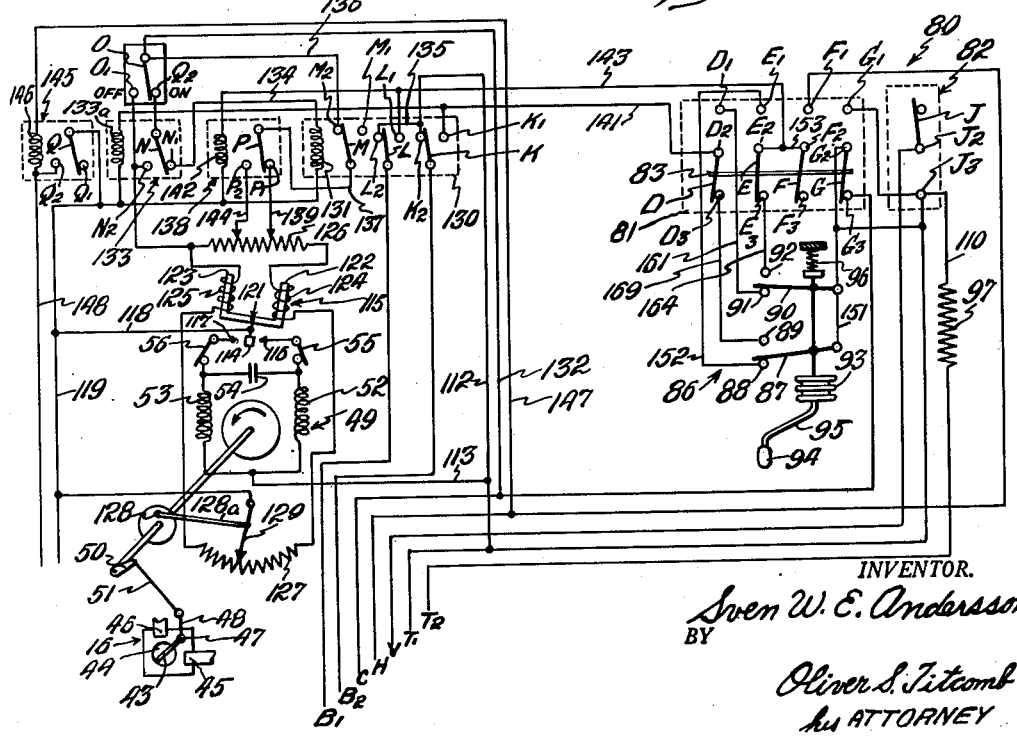
Fig. 4 is a view similar to Fig. 3 showing the thermostatic switches open, the humidity responsive switch closed and the relationship of the control elements to adjust the valve to a position between heating and cooling.

When the temperature in the enclosure 7 is sufficiently low and the humidity is high, the control arrangement will initiate operation of the air conditioning unit to dehumidify the air by cooling and reheat the dehumidified air. The relative position of the control elements for such dehumidification is illustrated in Fig. 4 of the drawings. The humidity responsive switch may be of any well-known construction for moving the contact O into engagement with contact O₂ upon a predetermined increase in the moisture content of the air. Upon engagement of contact O with contact O₂ a circuit is completed from the constantly energized branch circuit C through the conductor 132, switch contacts O, O₂ of the humidity responsive switch, contacts N and N₁ of supervisory relay 133 and conductor 134 to relay coil 131 of the dehumidification relay 130. The circuit is completed from the relay coil 131 through the common return conductors 119 and T₂.

Energization of the relay coil 131 of the dehumidification relay 130 moves the poles K, L and M from the position illustrated in Fig. 3 to the position illustrated in Fig. 4 to engage the fixed contacts K₂, L₂ and M₂. Branch circuits B₁ and B₂ are then energized simultaneously from T₁ through conductor 112, jumper 135, contacts K₂, K, and L₂, L, and conductors B₁ and B₂ to complete the branch circuits. Energization of branch circuits B₁ and B₂ will initiate operation of the refrigeration system at full capacity as previously described.

Simultaneously a circuit is completed from the C wire through the conductors 132 and 136, contacts M₂ and M of dehumidifying relay 130, conductor 137, contacts P and P₁ of reheat regulating relay 138 to the first tap 139 on the resistance element 126 of the balancing bridge circuit for the motor. Current flows simultaneously from the tap 139 through the portion of the resistance at the right-hand side of the tap, relay coil 124 and resistance 127 at the right-hand side of the follow-up contact 129 and also through the portion of the resistance 126 at the left-hand side of the tap, the relay coil 125 and portion of the resistance 127 at the left-hand side of the follow-up contact 129. Because of the lesser resistance on the right-hand side of the bridge circuit a greater current flow will occur in the relay coil 124 to rock the tilting relay 115 counterclockwise to engage its depending contact 114 with the contact 116.

Upon engagement of the contacts 114 and 116 a circuit will be completed from T₁, conductors 112 and 113, directly through motor field winding 52 and also through field winding 53 and condenser 54, limit switch 55, contacts 116 and 114 and conductors 118 and 119 to T₂. Direct energization of the field winding 52 will rotate the shaft of the motor 49 counterclockwise and operating through the crank 50, link 51 and crank 48 will move the valve element 43 away from the valve port 46 and toward the port 45. Rotation of the shaft of the motor 49 also operates through the crank 128 and link 128a to move the follow-up contact 129 from the position illustrated in Fig. 3 to that illustrated in Fig. 4. When the follow-up contact 129 has been moved to a position on the resistance 127 so that the opposite sides of the bridge circuit are sufficiently balanced with a slight preponderance on the relay coil 125, the tilting relay 115 will be rocked clockwise to disengage contact 114 from 116 and move to a floating position between contacts 116 and 117. The motor will then come to rest with the valve element 43 located at some position between the valve ports 45 and 46. Steam generated in the boiler 15 will then flow into the diverter valve 16 and be proportionately divided for flow through the conduits 26 to the refrigeration system and 41 to the heating coil 13, respectively. Thus, the refrigeration system and heating system are operated simultaneously to dehumidify the air by cooling it below its dew point and reheat the dehumidified air to cause dehumidification without cooling.

The tap 139 on the resistance element 126 of the balanced bridge circuit for the motor 49 may be initially adjusted to give the proper valve setting and proportionate divisions of steam to produce a resultant heating of the dehumidified air to insure against cooling the air below comfort conditions. Upon a decrease in the humidity of the air the contact O of the humidity responsive switch means moves from contact $O_2$ to contact $O_1$ to deenergize the dehumidifying control circuit which returns the parts to the relative positions illustrated in Fig. 3. Thus, the control arrangement is operable automatically upon an increase in the humidity to dehumidify the air if the unit is not already operating to cool the air.

*Dehumidification under control of the humidostat with regulation by thermostat*

Figure 5:
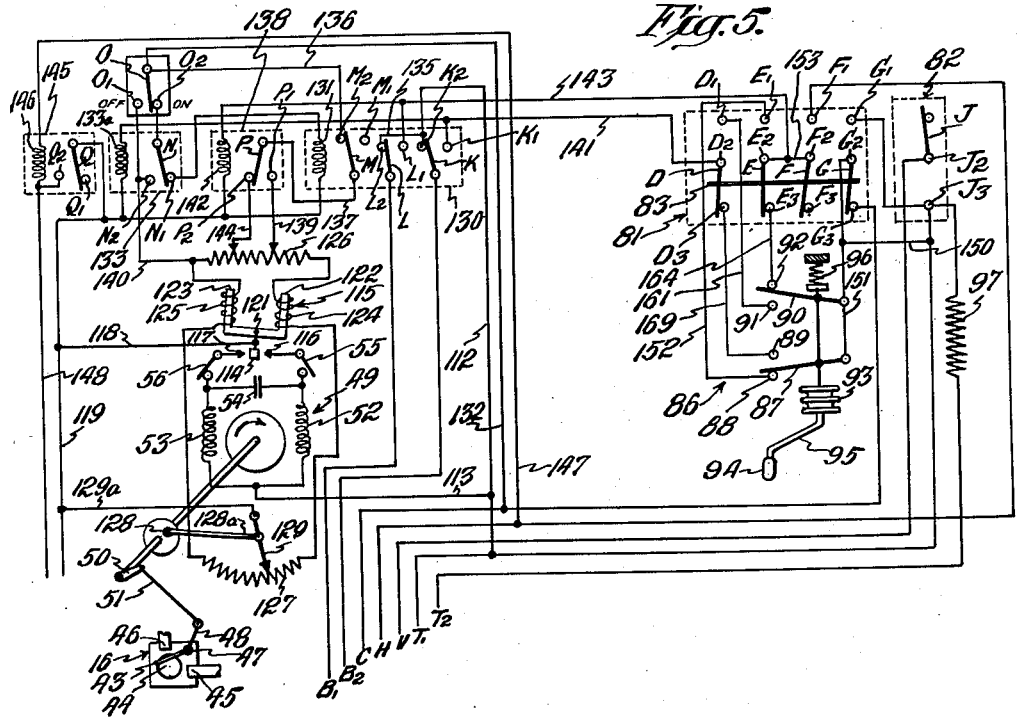
Fig. 5 is a view similar to Fig. 4 showing one of the thermostatic switches closed and a reheat regulating relay actuated to adjust the valve for decreasing the supply of heat to the heating element.

On the other hand, if the humidity remains high the unit will continue to operate to dehumidify the air by cooling and reheat the dehumidified air with a preponderance of heating to cause the temperature in the enclosure 7 to increase. The temperature responsive switch means 86 then regulates the control circuit and valve element 43 to decrease the rate of heating as illustrated in Fig. 5.

Upon an increase in the temperature in the enclosure 7, the movable contact 90 of the thermostatic switch means 86 will move into engagement with the contact 92 and complete a circuit from $T_1$ through conductors 150, 151, contacts 90 and 92, conductor 164, contacts $E_3$, E, $E_2$, jumper 153 and conductor 143, relay coil 142 of the reheat regulating relay 138 and common return conductor 119 to $T_2$. Upon energization of the relay coil 142 the contact P will be shifted into engagement with the contact $P_2$ and then complete a circuit from branch circuit C, conductors 132, 136, contacts $M_2$, M of dehumidifying relay 130, conductor 137, and contacts P, $P_2$ to second tap 144 on the resistance 126 of the balancing bridge circuit. Energization of the resistance 126 at the tap 144 will then unbalance the bridge circuit and cause a greater current to flow through the relay coil 125 than through the relay coil 124 and thereby rock the tilting relay 115 to engage its depending contact 114 with contact 117.

A circuit will then be completed from $T_1$ through conductors 112 and 113 and directly through motor field winding 53 to cause rotation of the shaft of the motor 49 clockwise. Such rotation of motor shaft will operate through the crank 50, link 51 and crank 48 to adjust the valve element 43 from the position illustrated in Fig. 4 to that illustrated in Fig. 5. Simultaneously, the crank 128 operating through the link 128a will move the follow-up contact 129 along the resistance 127 until the resistance on opposite sides of the bridge circuit are balanced, at which time the movable contact 114 of tilting relay 115 will move to a position between contacts 116 and 117 and stop the motor. The valve element 43 will then be held in the position illustrated in Fig. 5 and supply a greater amount of steam to the refrigeration system and a lesser amount of steam to the heating coil 13 and thereby decrease the rate of heating as the temperature in the enclosure 7 increases. By properly adjusting the tap 144 on the resistance 126 of the balancing bridge circuit a nicety of adjustment may be obtained so that the unit will continue operation to dehumidify the air by cooling and reheat the air without either substantial heating or cooling of the air in the enclosure 7.

*Dehumidification under supervisory control by thermostat*

Figure 6:
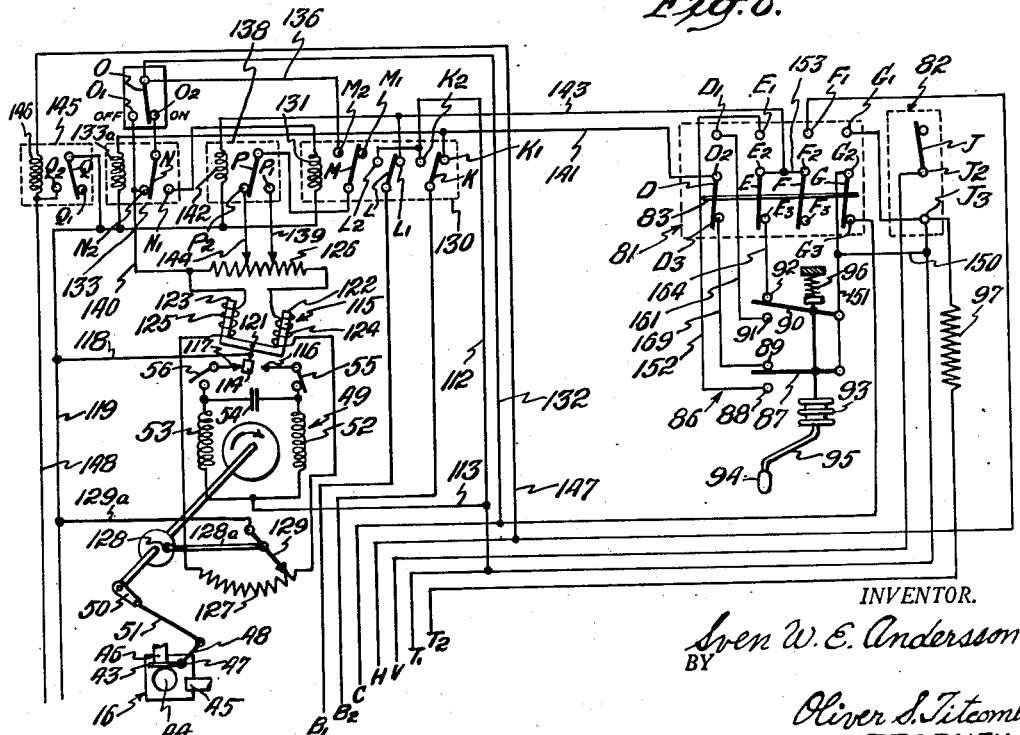
Fig. 6 is a view similar to Fig. 5 showing the second thermostatic switch closed and a supervisory relay actuated for adjusting the valve to stop the supply of heat to the heating element.

However, if the temperature in the enclosure 7 continues to increase the movable contact 87 of the thermostatic switch means 86 will move into engagement with the contact 89 and shift from humidostatic to thermostatic control as illustrated in Fig. 6. A circuit is then completed from $T_1$ through conductors 150 and 151, contacts 87 and 89, conductor 169, contacts $D_3$, D and $D_2$ of the selective switch 81 and conductor 141 to relay coil 133a of the supervisory relay 133. The circuit for the relay coil 133a is completed through the common return conductors 119 and $T_2$. Upon energization of the relay coil 133a the contact N is moved into engagement with contact $N_2$, as illustrated in Fig. 6. The disengagement of the contacts N and $N_1$ of the supervisory relay 133 opens the circuit through the relay coil 131 of the dehumidifying relay 130 and the switch contacts K, L and M move from the position illustrated in Fig. 5 to that illustrated in Fig. 6 so that branch circuits $B_1$ and $B_2$ are returned to control by the thermostatic switch means 86, as illustrated in Fig. 3 for straight cooling.

The engagement of the contact N with the contact $N_2$ of the supervisory relay 133 will complete a circuit from C through conductors 132, contacts O and $O_2$ of the humidity responsive switch, contacts N and $N_2$ and conductor 140 to one end of the resistance element 126. A greater amount of current then will flow through the relay coil 125 than through the relay coil 124 to rock the tilting switch relay 115 and engage the contact 114 with the contact 117 and thereby energize the motor field winding 53 as previously explained. Energization of the field winding 53 will turn the shaft of motor 49 clockwise to move the valve element 43 from the position illustrated in Fig. 5 to that illustrated in Fig. 6. Steam from the boiler 15 then flows to the refrigeration system to cause the unit to operate on straight refrigeration without reheat.

Should the temperature in the enclosure decrease the contacts 87 and 89 of the thermostatic switch means 86 will open, deenergize the relay coil 133a of the supervisory relay 133 and cause contact N to move into engagement with contact $N_1$ to shift back to dehumidification with reheating, as illustrated in Fig. 5. However, at no time will the unit operate to supply heat to the dehumidified air when the thermostatic switch means 86 calls for cooling at full input. The dehumidification of the air either under control of the humidostat switch O or under joint control by humidostatic switch O and thermostatic switch means 86 will continue so long as the humidity remains high. However, when the switch contact O moves into engagement with the contact $O_1$ of the humidity responsive switch, the dehumidifying relay 130 will be deenergized and the relays will return to the position illustrated in Fig. 3 for straight cooling.

*Ventilation without heating or cooling*

Under some conditions as during the spring and fall seasons, it may be desirable to circulate air in the enclosure 7 without either heating or cooling. When such ventilation is desired the lever 85 of the controller 80 is actuated to move the pole J into engagement with contact $J_3$. A circuit is then completed from the transformer 101 through the conductor T1, contacts J3, J and J2 to energize the branch circuit V. The circuit is completed through the fan relay coil 159 and conductors 160 and T2 to the opposite terminal of the transformer. Energization of relay coil 159 closes relay 104 to energize the circulating fan 10. Air will then be circulated in the enclosure 7 through the ducts 8 and 9 by the fan 10 without heating, cooling or dehumidifying the air.

Summation

It will now be observed that the present invention provides an improved control for an air conditioner for either heating or cooling the air in an enclosure under thermostatic control and dehumidifying the air under humidostatic control. It will still further be observed that the present invention provides an arrangement for dehumidifying the air by cooling and reheating the dehumidified air to produce a resultant heating of the air delivered to the enclosure. It will still further be observed that the present invention provides for regulating the heating of the dehumidified air so as to decrease the heating as the temperature increases and stop heating when the thermostat calls for cooling.

While a single embodiment of the control arrangement of the present invention is herein illustrated and described, it will be understood by those skilled in the art that changes may be made in the construction and arrangement of parts without departing from the spirit or scope of the invention. It is to be further understood that the term "humidostat" is used generically in the specification and claims to include any control device responsive to changes in the relative humidity or moisture content of the air. Therefore, without limiting myself in this respect, the invention is defined by the following claims.

I claim:

1. In an air conditioning unit, a cooling element, a heating element, means for simultaneously supplying cooling medium to the cooling element to dehumidify the air to be conditioned by cooling it below its dew point and heating medium to the heating element to heat the dehumidified air, a humidostat for controlling operation of said means, and a thermostat responsive to a condition affected by the heating and cooling elements and cooperating with the humidostat to control said means to decrease the supply of heat to the heating element as the temperature increases and stop the supply of heat to the heating element at a predetermined temperature.

2. In an air conditioning unit, a cooling element, a heating element, means comprising a thermostat operable at a predetermined temperature to supply a cooling medium to the cooling element to cool the air, means comprising a humidostat operable below said predetermined temperature for simultaneously supplying cooling and heating medium to the cooling and heating elements, respectively, to dehumidify the air to be conditioned by cooling it below its dew point and heat the dehumidified air, said thermostat cooperating with said humidostat at said predetermined temperature to decrease the rate at which heating medium is supplied to said heating element, and said thermostat operating upon a further predetermined increase in temperature to stop the supply of heating medium to the heating element.

3. In an air conditioning unit, a cooling element, a heating element, valve means for controlling the supply of cooling medium to the cooling element and heating medium to the heating element, a humidostat for adjusting the valve means to simultaneously supply cooling medium to the cooling element to dehumidify the air by cooling and heating medium to the heating element to heat the dehumidified air, said valve means proportioning the supply of cooling medium and heating medium to the cooling and heating elements, respectively, so as to produce a resultant heating of the air, a thermostat responsive to an increase in temperature and cooperating with the humidostat to adjust the valve means to proportion the supply of cooling and heating medium so as to reduce the rate of heating, and said thermostat being responsive to a further increase in temperature for adjusting the valve means to stop the supply of heat to the heating element.

4. In an air conditioning unit, a heat operated refrigeration system having a cooling element, a heating element, a source of heat, means for supplying heat from said source to the heat operated refrigeration system and heating element simultaneously, a humidostat for controlling operation of said means, a thermostat responsive to a temperature condition affected by the heating and cooling elements and operable at a predetermined temperature for actuating said means to decrease the amount of heat supplied to the heating element, and said thermostat being responsive to a further increase in temperature for actuating said means to stop the supply of heat to the heating element.

5. In an air conditioning unit, a heat operated refrigeration system having a cooling element, a heating element, a source of heat, valve means for directing heat from said source to the refrigeration system or heating element, means comprising a humidostat for supplying heat from said source and adjusting the valve means to simultaneously deliver heat to the refrigeration system and heating element to dehumidify the air by cooling and heat the dehumidified air, said valve means proportioning the supply of heat so as to produce a resultant heating of the air, means comprising a thermostat responsive to an increase in temperature for adjusting the valve means to proportion the supply of heat so as to reduce the rate of heating by the heating element, and said thermostat being responsive to a further increase in temperature for adjusting the valve means to stop the supply of heat to the heating element.

6. In an air conditioning unit, a heat operated refrigeration system having a cooling element, a heating element, a source of heat, valve means for directing heat from said source to the refrigeration system, means comprising a thermostat operable above a predetermined temperature for regulating the supply of heat from said source to the refrigeration system to cool and dehumidify the air, means comprising a humidostat operable below said predetermined temperature for supplying heat from said source and adjusting the valve means to simultaneously deliver said heat to the refrigeration system and heating element to dehumidify the air by cooling and heat the dehumidified air, said valve means proportioning the supply of heat so as to produce a resultant heating of the air, said thermostat being connected with the humidostat to adjust the valve means at said predetermined temperature to reduce the supply of heat to the heating element and adjust the valve upon a further increase in temperature to stop the supply of heat to the heating element.

7. In an air conditioning unit, a heat operated refrigeration system having a cooling element, a heating element, a source of heat, selective means for selecting either the refrigeration system or heating element for operation, means for supplying heat from said source to the selected refrigeration system or heating element, a thermostat for controlling operation of the heat supplying means, a humidostat operable when the refrigeration system is selected for operation for controlling operation of the heat supplying means to simultaneously supply heat from said source to the refrigeration system and heating element, said thermostat being connected to and supervising the operation of said humidostat to actuate the heat supplying means to reduce the amount of heat supplied to the heating element upon an increase in temperature, and said thermostat actuating the heat supplying means to stop the supply of heat to the heating element upon a further increase in temperature.

8. In an air conditioning unit, a heat operated refrigeration system having a cooling element, a heating element, a source of heat, selective means for selecting either the refrigeration system or heating element for operation, a thermostat connected to the selective means and having a plurality of thermal responsive elements operable sequentially upon a change in a temperature condition, means operated by the thermostat for supplying and regulating the supply of heat from said source to the selected refrigeration system or heating element in a plurality of steps, a humidostat for controlling the heat supplying means and operable when the refrigeration system is selected for operation to simultaneously supply heat from said source to the refrigeration system and heating element to dehumidify and heat the dehumidified air, and said thermostat being connected to and supervising the operation of said humidostat as the thermal responsive elements are operated sequentially to reduce the amount of heat supplied to the heating element in a plurality of steps.

9. In an air conditioning unit, a heat operated refrigeration system having a cooling element, a heating element, a source of heat, a valve, an electric motor for adjusting said valve, an electric control arrangement having selective switch means for energizing said motor to adjust the valve to deliver heat from said source to the refrigeration system to cool the air, and a switch responsive to a humidity condition for energizing said motor to adjust the valve to simultaneously deliver heat to the refrigeration system to cool and dehumidify the air and to the heating element to heat the dehumidified air.

10. In an air conditioning unit, a heat operated refrigeration system having a cooling element, a heating element, a source of heat, a valve, an electric motor for adjusting said valve, and an electric control arrangement for the motor having selective switch means for energizing the motor to adjust the valve to heating position to connect the source of heat to the heaing element or adjust the valve to cooling position to connect the source of heat to the refrigeration system, and a switch responsive to a humidity condition for energizing said motor to adjust the valve to simultaneously deliver heat from said source to the refrigeration system to cool and dehumidify the air and to the heating element to heat the dehumidified air.

11. In an air conditioning unit, a heat operated refrigeration system having a cooling element, a heating element, a source of heat, a valve for directing heat from said source to the refrigeration system and heating element, an electric motor for operating said valve, an electric control having switch means for energizing the motor to adjust the valve to select the refrigeration system or the heating element for operation, means for regulating the supply of heat from said source to the selected refrigeration system or heating element, switch means in the electric control responsive to a temperature condition for actuating the regulating means, and switch means in the electric control responsive to a humidity condition when the refrigeration system is selected for operation for supplying heat from said source and energizing said motor to adjust the valve to simultaneously direct said heat to the refrigeration system to cool and dehumidify the air and to the heating element to heat the dehumidified air.

12. In an air conditioning unit, a heat operated refrigeration system having a cooling element, a heating element, a source of heat, a valve for directing heat from said source to the refrigeration system and heating element, an electric motor for adjusting said valve, an electric control having selective switch means for energizing the motor to adjust the valve to direct heat from said source to the refrigeration system, means for regulating the supply of heat from said source, a switch in the electric control responsive to a temperature condition and operable above a predetermined temperature for actuating the heat regulating means to supply heat from said source to the refrigeration system to cool the air, a switch in the electric control responsive to a humidity condition and operable below said predetermined temperature for actuating the heat regulating means to supply heat from said source and energize said motor to adjust the valve to simultaneously supply heat to the refrigeration system to cool and dehumidify the air and to the heating element to heat the dehumidified air, said valve proportioning the heat supplied from said source to the refrigeration system and heating element to produce a resultant heating of the air, and said temperature responsive switch being connected with the humidity responsive switch to energize said motor upon an increase in temperature to adjust the valve to reduce the heat supplied to the heating element.

13. In an air conditioning unit, a heat operated refrigeration system, a heating element, a source of heat, a valve, an electric motor for adjusting the valve, a humidostat connected to energize the motor and adjust the valve to deliver heat from said source to the refrigeration system and heating element simultaneously for dehumidifying the air by cooling and heating the dehumidified air, and a thermostat connected to energize the motor and adjust the valve with a step control to decrease the rate of heating as the temperature of the air increases.

14. In an air conditioning unit, a heat operated refrigeration system, a heating element, a source of heat, a valve, an electric motor for adjusting the valve, selective means connected to energize the motor and adjust the valve to deliver heat from said source to the refrigeration system or heating element, a humidostat connected to energize the motor and adjust the valve to deliver heat from said source to the refrigeration system and heating element simultaneously for dehumidifying the air by cooling and heating the dehumidified air, and a thermostat connected to energize the motor and adjust the valve with a step control to decrease the rate of heating as the temperature of the air increases.

15. In an air conditioning unit, a heat operated refrigeration system, a heating element, heat supplying means, a valve, an electric motor for adjusting the valve, selective means connected to energize the motor to adjust the valve to deliver heat from said heat supplying means to the refrigeration system or heating element, a thermostat for regulating the heat supplying means to supply heat to the selected system in a series of steps, a humidostat having a humidity responsive switch and connected to energize the motor and adjust the valve to deliver heat from said supplying means to the refrigeration system and heating element simultaneously to dehumidify the air by cooling and heat the dehumidified air, and a dehumidifying relay energized by the humidity responsive switch for shifting the heat supplying means from thermostatic to humidostatic control, said dehumidifying relay also connecting the motor for control by the thermostat to adjust the valve with a step control to decrease the rate of heating as the temperature of the air increases.

16. In an air conditioning unit, a heat operated refrigeration system, a heating element, heat supplying means, a valve, an electric motor for adjusting the valve, selective means connected to energize the motor to adjust the valve to deliver heat from said heat supplying means to the refrigeration system or heating element, a thermostat for regulating the heat supplying means to supply heat to the selected system, a humidostat having a humidity responsive switch and connected to energize the motor and adjust the valve to direct heat from said supplying means to the refrigeration system and heating element simultaneously to dehumidify the air by cooling and heat the dehumidified air, a dehumidifying relay energized by the humidity responsive switch for shifting the heat supplying means from thermostatic to humidostatic control, and a heat regulating relay responsive to the thermostat for energizing the motor and adjusting the valve to decrease the rate of heating as the temperature increases.

17. In an air conditioning unit, a heat operated refrigeration system, a heating element, heat supplying means, a valve, an electric motor for adjusting the valve, selective means connected to energize the motor to adjust the valve to direct heat from said heat supplying means to the refrigeration system or heating element, a thermostat for regulating the heat supplying means to supply heat to the selected system, a humidostat having a humidity responsive switch and connected to energize the motor and adjust the valve to direct heat from said source to the refrigeration system and heating element simultaneously, a dehumidifying relay energized by the humidity responsive switch for shifting the heat supplying means from thermostatic to humidostatic control, a heat regulating relay responsive to the thermostat for decreasing the rate of heating as the temperature increases, and a supervisory relay responsive to the thermostat for shifting the motor from humidostatic to thermostatic control upon a further increase in temperature.

18. In an air conditioning unit, a heat operated refrigeration system, a heating element, a source of heat, a valve, an electric motor for adjusting the valve, a balancing motor control bridge circuit having an electric resistance element with a plurality of taps and a balancing resistance adjusted by the motor, selective switch means for energizing the circuit at one of the taps for operating the motor and adjusting the valve to connect the source of heat to the refrigeration system, and humidity responsive switch means for energizing said circuit at another tap for operating the motor and adjusting the valve to simultaneously connect the source of heat to the refrigeration system and heating element to dehumidify the air by cooling and heat the dehumidified air.

19. In an air conditioning unit, a heat operated refrigeration system, a heating element, a source of heat, a valve, an electric motor for adjusting the valve, a balancing motor control bridge circuit having an electric resistance element with a plurality of taps and a balancing resistance adjusted by the motor, selective switch means for energizing the circuit at one of the taps for operating the motor and adjusting the valve to connect the source of heat to the refrigeration system, humidity responsive switch means for energizing said circuit at another tap for operating the motor and adjusting the valve to simultaneously connect the source of heat to the refrigeration system and heating element to dehumidify the air by cooling and heat the dehumidified air, and a temperature responsive switch for energizing said circuit at another tap for operating the motor and adjusting the valve to reduce the amount of heat delivered to the heating element.

20. In an air conditioning unit, a heat operated refrigeration system, a heating element, a source of heat, a valve, an electric motor for adjusting the valve, a balancing motor control bridge circuit having an electric resistance element with a plurality of taps and a balancing resistance adjusted by the motor, selective switch means for energizing the circuit at one of the taps for operating the motor and adjusting the valve to connect the source of heat to the refrigeration system, humidity responsive switch means for energizing said circuit at another tap for operating the motor and adjusting the valve to simultaneously connect the source of heat to the refrigeration system and heating element to dehumidify the air by cooling and heat the dehumidified air, a temperature responsive switch for energizing said circuit at another tap for operating the motor and adjusting the valve to reduce the amount of heat delivered to the heating element, and a second temperature responsive switch for energizing the circuit at the first tap for operating the motor and adjusting the valve to the cooling position to cool and dehumidify the air without heating.

21. In an air conditioning unit, a heat operated refrigeration system, a heating element, a source of heat, a valve, an electric motor for adjusting the valve, a balancing motor control bridge circuit having an electric resistance element with a plurality of taps and a balancing resistance adjusted by the motor, selective switch means for energizing the circuit at one of the taps for operating the motor and adjusting the valve to connect the source of heat to the refrigeration system, humidity responsive switch means for energizing said circuit at another tap for operating the motor and adjusting the valve to simultaneously connect the source of heat to the refrigeration system and heating element to dehumidify the air by cooling and heat the dehumidified air, and temperature responsive switch means for energizing said circuit at the plurality of taps sequentially as the temperature increases whereby to regulate the heat supplied to the heating element in a plurality of steps in accordance with a condition affected by the heating and cooling element.

22. In an air conditioning unit, a heat operated refrigeration system having a cooling element, a heating element, a source of heat, a valve for directing heat from said source to the refrigeration system and heating element, an electric motor for adjusting said valve, an electric control arrangement including a balancing motor control bridge circuit having a resistance element with a plurality of taps and a compensating variable resistance adjusted by operation of the motor, a switch responsive to humidity conditions for energizing the motor control circuit at one of the resistance taps to adjust the valve to simultaneously supply heat to the refrigeration system to cool and dehumidify the air and to the heating element to heat the dehumidified air, said valve proportioning the supply of heating medium to produce a resultant heating of the air, a switch responsive to an increase in temperature to energize the motor control circuit at another resistance tap to adjust the valve to reduce the heating of the air, and a switch responsive to a further increase in temperature to energize the motor control circuit at another resistance tap to adjust the valve to stop the supply of heat to the heating element.

23. In an air conditioning unit, a heat operated refrigeration system having a cooling element, a heating system having a heating element, a steam boiler, a valve for directing steam from said boiler to the refrigeration system and heating system, an electric motor for adjusting said valve, an electric control arrangement having a selective switch for energizing the motor to adjust the valve to direct steam from said boiler to the refrigeration system or heating system, switch means responsive to a temperature condition for initiating and regulating operation of the steam boiler to supply steam to the selected system, switch means responsive to a humidity condition when the refrigeration system is selected for operation for initiating operation of the steam boiler and energizing said motor to adjust the valve to simultaneously direct steam to the refrigeration system to dehumidify the air by cooling and to the heating system to heat the dehumidified air, said valve proportioning the supply of steam from said boiler to the refrigeration and heating systems to produce a resultant heating of the air, and said temperature responsive switch cooperating with the humidity responsive switch to adjust the valve upon an increase in temperature to reduce the heat supplied to the heating element.

SVEN W. E. ANDERSSON.

REFERENCES CITED

The following references are of record in the file of this patent:

UNITED STATES PATENTS

| Number | Name | Date |
|---|---|---|
| 2,204,016 | Karlson | June 11, 1940 |
| 2,352,930 | Anderson | July 4, 1944 |
| 2,356,556 | Andersson | Aug. 22, 1944 |
| 2,381,427 | Andersson | Aug. 7, 1945 |